(12) United States Patent
Melton

(10) Patent No.: US 7,311,026 B2
(45) Date of Patent: Dec. 25, 2007

(54) STRIP RESISTANT SCREW HEAD AND SCREWDRIVER TIP IN COMBINATION

(76) Inventor: Joshua Robert Melton, 1074 E. 4100 South, Ogden, UT (US) 84403

(*) Notice: Subject to any disclaimer, the term of this patent is extended or adjusted under 35 U.S.C. 154(b) by 0 days.

(21) Appl. No.: 11/359,902

(22) Filed: Feb. 21, 2006

(65) Prior Publication Data

US 2007/0193419 A1 Aug. 23, 2007

(51) Int. Cl.
*B25B 15/00* (2006.01)
*B25B 23/10* (2006.01)

(52) U.S. Cl. ............................ 81/436; 81/451; 81/460
(58) Field of Classification Search .................. 81/436, 81/451, 452, 125, 460; 411/406, 407, 911
See application file for complete search history.

(56) References Cited

U.S. PATENT DOCUMENTS

| | | | | |
|---|---|---|---|---|
| 2,954,719 A | * | 10/1960 | Vaughn | ...................... 411/406 |
| 3,540,342 A | * | 11/1970 | Vaughn | ...................... 411/407 |
| 4,338,835 A | | 7/1982 | Simons | |
| 4,538,486 A | * | 9/1985 | Lutrat | ......................... 81/460 |
| 4,873,900 A | | 10/1989 | Ciumaga | |
| 5,269,209 A | | 12/1993 | Baker | |
| 5,438,895 A | * | 8/1995 | Bassell et al. | ................. 81/451 |
| 5,868,049 A | * | 2/1999 | Kanwal | ....................... 81/460 |
| 6,202,512 B1 | | 3/2001 | O'Brien et al. | |
| 6,302,631 B1 | | 10/2001 | Takasaki et al. | |
| 6,378,406 B1 | | 4/2002 | Totsu | |
| 7,165,482 B2 | * | 1/2007 | Shapoval | ..................... 81/451 |

* cited by examiner

*Primary Examiner*—Hadi Shakeri
(74) *Attorney, Agent, or Firm*—Raymond M. Galasso; Galasso & Associates, LP

(57) ABSTRACT

A screw head and screwdriver for use in combination are provided to reduce the occurrence of stripping a screw head during tightening or removing the screw. The head slot employs slot walls that indent in some portion of the wall, the indent portion forming a ledge under which the screwdriver tip may be retentively captured thereby preventing the tip from lifting from the screw slot and stripping the screw head. The screw slot and driver also generally employ a tapered form, such that the slot widens from a central portion out to the outer circumferential edges. The narrow portion of the slot matching in form a narrow portion of the driver tip such that the driver tip tends not to slide off the screw head during use. Utilizing these inventive design concepts prevents the screwdriver tip from slipping off the head and resulting in the need to apply less downward pressure.

5 Claims, 8 Drawing Sheets

STRIP RESISTANT SCREW HEAD AND SCREWDRIVER TIP IN COMBINATION

FIELD OF THE DISCLOSURE

The disclosures made herein relate generally to the screws as commonly used as fasteners and to tools designed to torsionally drive screws, and more particularly to screws having a screw head designed to capture the screwdriver tip under a ledge in the screw head and thereby reduce the chance of the screwdriver tip migrating out of the screw head, and to a screw slot and driver tip design having a screw slot which narrows in the center such as to prevent the driver tip from sliding horizontally out of the slot. The combination of these features prevents the stripping of the screw slot. The disclosures herein additionally relate to a screwdriver tip designed to work with screw heads incorporating the features outlined above. As an additional feature, embodiments disclosed herein reduce the amount of downward force that must be provided to tighten or remove a screw without stripping the head.

BACKGROUND

Screws and bolts of various designs are known and are commonly used as fasteners for assembly of useful articles. Characteristically screws have a threaded shank portion, a tip design depending on the application, and a head having one or more slots. Driver bits of various designs are configured to fit the drive slot or slots on the screw head and engage the screw by transmitting a rotary force or torque through the driver bit to the screw head, generally through the screw head slot sidewalls.

Screwdriver tips generally have a relatively short blade tip length at the portion that engages the screw head. Screws are inserted or removed from a work piece by the application of a twisting force or torque to the head of the screw. By way of definition, torque is a force applied at a distance from an axis of revolution resulting in a twisting force about the axis. In the case of a common screw the axis of revolution is through the center of the head, and the driver to head contact distance is the smaller of half the slot length or half the drive tip blade length. As is well known, the force applied by the screw driver blade tip to the slot wall of the screw head increases as the driver head to screw head contact distance decreases.

As screw heads are of rather small diameter, a given value of torque applied to drive or remove a screw from a work piece results necessarily in significant forces applied by the driver tip against the walls of the slot of the screw. This large sidewall force can result in the distortion of the slot in the screw head, requiring increasing amounts of downward force to be applied on the screw driver and tip to keep the driver tip within the screw slot and prevent it from riding out of the slot in the now deformed and damaged screw slot walls. A failure of the user to provide sufficient downward force results in the driver tip riding out of the slot and further damaging the screw sidewall and thereby requiring even more downward force to be applied. This series of events progressively damages the screw slot to the point where sufficient torque can no longer be transmitted to the screw by the driver tip as the driver tip now easily rides over and out of the now deformed slot sidewalls. This undesirable tendency of the screw head sidewalls to deform and damage is referred to herein as 'stripping', and is an undesirable limitation of commonly known screw and screwdriver tip designs.

In the case of self-tapping screws, these screws require that substantial amount of additional torque be applied to the screw head to achieve tapping and form of the screw hole in the piece to which it is being threaded. The additional torque is required to overcome frictional forces between the screw and the material receiving the screw, and to provide material deformation forces to enlarge and thread the hole in the work piece. For illustration with an example most readers will relate to, one common example of self-tapping screw applications are in sheet metal screws as used for instance in residential furnace heating ductwork installation. Another example would be self-tapping screws applied into hardened resin materials, metals such as steel and aluminum, and even formed aggregates such as concrete.

Therefore, a screwdriver tip and screw head design in combination that can prevent damage to the screw head slot, a screw head design that can capture the driver tip under a ledge in the head and thereby prevents the screw head from stripping, as well as reduces the amount of downward force that need be applied through the screw driver to the screw head to keep the driver tip from riding out of the screw slot, such a screw head and screwdriver tip design would be useful and novel.

SUMMARY OF THE DISCLOSURE

Accordingly, embodiments of the inventive disclosures made herein comprise various embodiments of a screw head and a screwdriver tip in combination, that when applied in combination, reduce the chance of stripping the screw head when inserting or removing a screw from a work piece.

In a first and at least one embodiment of the inventive disclosures made herein, a screw head for a threaded screw shank comprises a tapered slot bisecting a top end portion of the head, the head secured at an opposing bottom end to the shank portion. The screw head comprises a slot tapered across the top portion of the head such that the slot is narrowest at a center portion of the head and widens outwardly towards the circumferential side edges of the screw head. The screw head slot having substantially opposing inclined sidewall surfaces connected by a substantially flat bottom surface. The sidewall surfaces are inclined such that the slot is widest where the sidewalls intersect the bottom surface. The walls of the screw head slot are inclined to form a ledge for capturing the screwdriver tip against the sidewalls and the slot bottom surface. In the same embodiment the screwdriver tip is sized and configured for being received and engaged into the screw head slot. The screwdriver tip having a screw slot insertion end, a driven portion, and a middle portion between the insertion end and the driven portion. The screwdriver tip comprises a tip bottom face at the insertion end of the tip and opposing major front and rear torque drive faces joined by circumferential right and left side faces. The circumferential right and left side faces intersect the tip bottom face while the front and rear faces are formed such that the tip widens from a central portion of the tip outwards towards the right and left faces in a fashion similar to the screw head slot above. The screw driver tip right and left faces being formed such that the bottom face is wider than a distal parallel section taken through the middle portion of the tip so that the insertion end of the tip can be retentively engaged under the ledge of the screw slot.

In another embodiment of the inventive disclosures made herein, a screw head for a threaded screw modify the above first embodiment by additionally comprising angled faces on the circumferential sides of the screw head, the angled faces configured to engage and be driven by a standard hexagonal socket wrench socket or similar tool.

In further embodiment of the inventive disclosures made herein, a screw head for a threaded screw and a screwdriver tip modify the above first combination embodiment by providing that the screw head sidewalls taper continuously from the bottom surface of the screw head slot up the head to the top end portion of the head at an angle between 45 and 89 degrees relative to the slot bottom surface; and modify the screwdriver tip front and rear faces to be continuously tapered, sized and formed to be received into this screw head slot and retentively engaged by the ledge of the screw slot.

In yet another embodiment of the inventive disclosures made herein, a screw head for a threaded screw and a screwdriver tip according to the first embodiment are further modified to provide that the screw head sidewalls have a convex curved form between the screw head bottom surface and the screw head top end portion. The screwdriver tip front and rear faces each have a concave form where the tip concave form is sized and shaped to be received into the screw head slot, and once engaged the screwdriver tip is retained under the ledge portion of the screw slot.

In another embodiment of the inventive disclosures made herein, a screw head for a threaded screw in combination wherein the screw head sidewalls each consist of two joined faces, one being a substantially flat face normal to the screw head bottom surface and intersecting the bottom surface at one edge of the flat face, and a second convex curved face joining the flat face at the opposite edge of the flat face and spanning to join the top end portion of the head. The screwdriver tip front and rear faces each having two joined faces, one a tip flat face normal to the tip bottom face having an edge joining the tip bottom face, and a second convex curved face joining the tip flat face at the opposite edge of the tip flat face and spanning toward the driven portion, the two joined faces sized and formed to be received into the screw head slot, engage the screw head sidewalls and be retentively engaged by the ledge of the screw slot.

It is another objective of the inventive disclosure made herein to provide a torsionally driven screw and mating screwdriver tip combination designed to lock the screwdriver tip under a ledge of the screw head thereby reducing the chance of stripping the head of the screw while the screw is torsionally driven by the screwdriver.

It is another objective of the inventive disclosure made herein to provide a torsionally driven screw and mating screwdriver tip combination design which reduces the amount of downward force required to maintain the screwdriver tip seated within the screw head when tightening a screw into a work piece or removing the screw from the work piece.

It is another objective of the inventive disclosure made herein to provide a torsionally driven screw head that may be driven by the non-strip driver of the present inventive disclosure. Additionally it is conceived and intended that in various embodiments the circumferential side edges of the non-strip screw head is provided with angled faces sized and configured to engage with and be driven by a hexagonal socket of a standard socket wrench. This feature for optional socket wrench drive is envisioned and intended for all the various head embodiments disclosed in this application. In the hexagonal socket drive configuration the screw may be driven by the non-strip driver of the present invention or a by use of a conventional socket wrench if desired.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
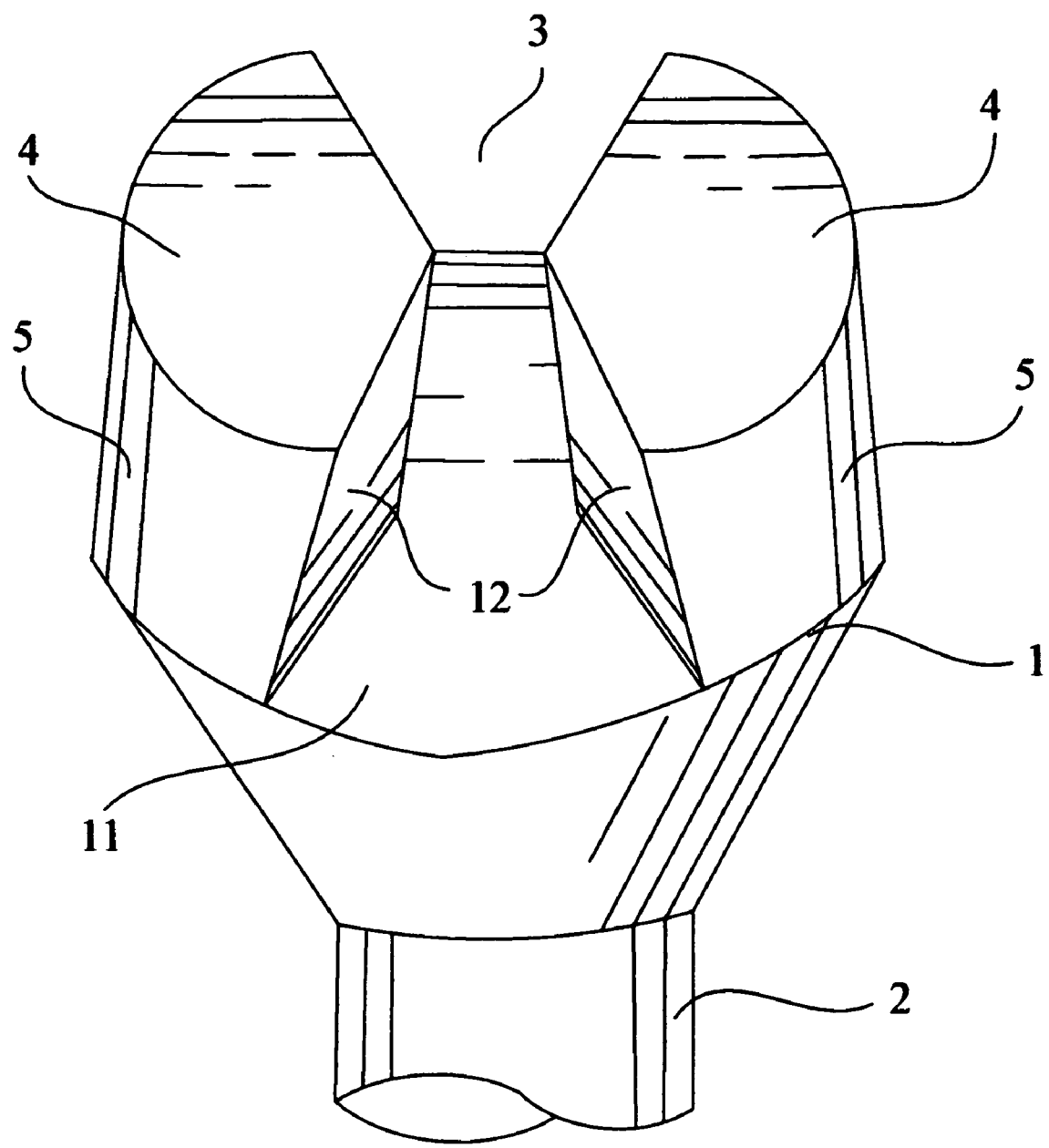
FIG. 1 presents a perspective view of one embodiment of a strip resistant screw head in accordance with the inventive disclosures herein.
Figure 7:
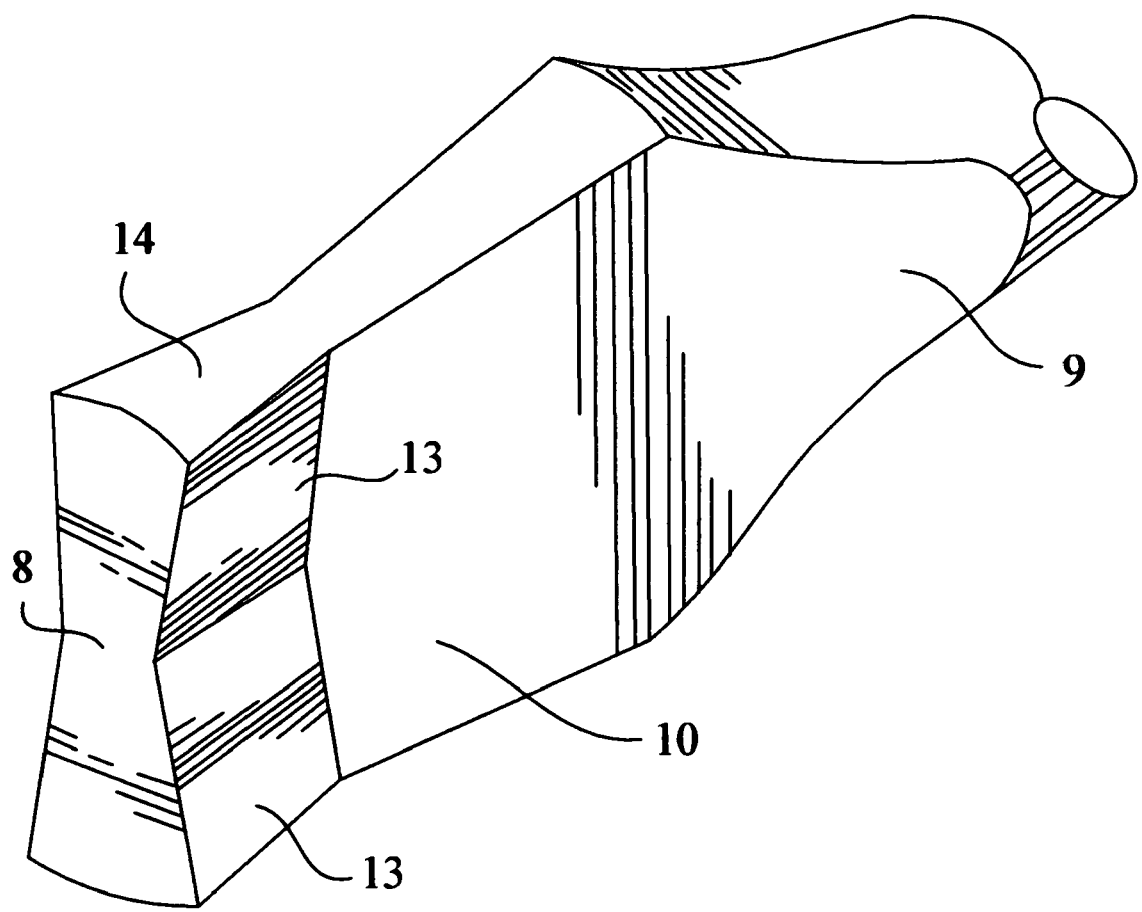
FIG. 7 presents a perspective view of one embodiment of a strip resistant screwdriver tip in accordance with the inventive disclosures herein, the driver tip being configured to drive the single angled screw head of FIG. 1.

Turning now to the combination of embodiments depicted in FIG. 1 and FIG. 7:

FIG. 1 depicts one particular embodiment of strip resistant screw head in accordance with the inventive disclosures presented herein. FIG. 7 depicts one particular embodiment of a strip resistant screwdriver tip which when used in combination with the screw head embodiment of FIG. 1 provides a strip resistant screw and screwdriver tip combination. In FIG. 1 the screw comprises a shank portion 2 onto which a screw head 1 is formed or secured. The screw head 1 is provided with a tapered slot 3 which bisects the top portion or top face 4 of the screw head. The tapered slot is narrower at the top portion or top face of the screw head and widens at the base 11 of the screw slot such that the screw slot driven side surfaces 12 taper into the sides of the screw head. This inward taper provides a ledge which acts to capture the single angled screwdriver tip 13 of FIG. 7. In FIG. 1 the screw head comprises two circumferential side edges 5. Strip resistant screw heads in accordance with the inventive disclosures herein may comprise one or more circumferential edges, however, the invention is not limited to two circumferential screw head edges. In FIG. 1 the screw head slot is tapered across the top portion of the head such that the slot is narrowest at a center portion of the head and widens outwardly towards the circumferential head edges.

Focusing more on FIG. 7 in combination with FIG. 1, in FIG. 7 the screwdriver tip is sized and configured to engage into the screw slot of FIG. 1. The tip having a screw slot insertion end 8, a driven portion 9, and a middle portion 10 between the insertion end and the driven portion. The screwdriver tip screw slot insertion end has a bottom face 8 which when in use mates against the bottom face 11 of the screw slot. The screwdriver tip has opposing major front and rear torque drive faces 13 joined by circumferential right and left side faces 14. The front and rear circumferential faces 14 formed such that the tip widens from a central portion of the tip outwards towards the right and left circumferential faces 14. The right and left drive faces 13 formed such that the bottom face is wider than a distal parallel section taken through the middle portion of the tip so that the insertion end 8 of the tip can be retentively engaged under the ledge of the screw slot.

Figure 2:
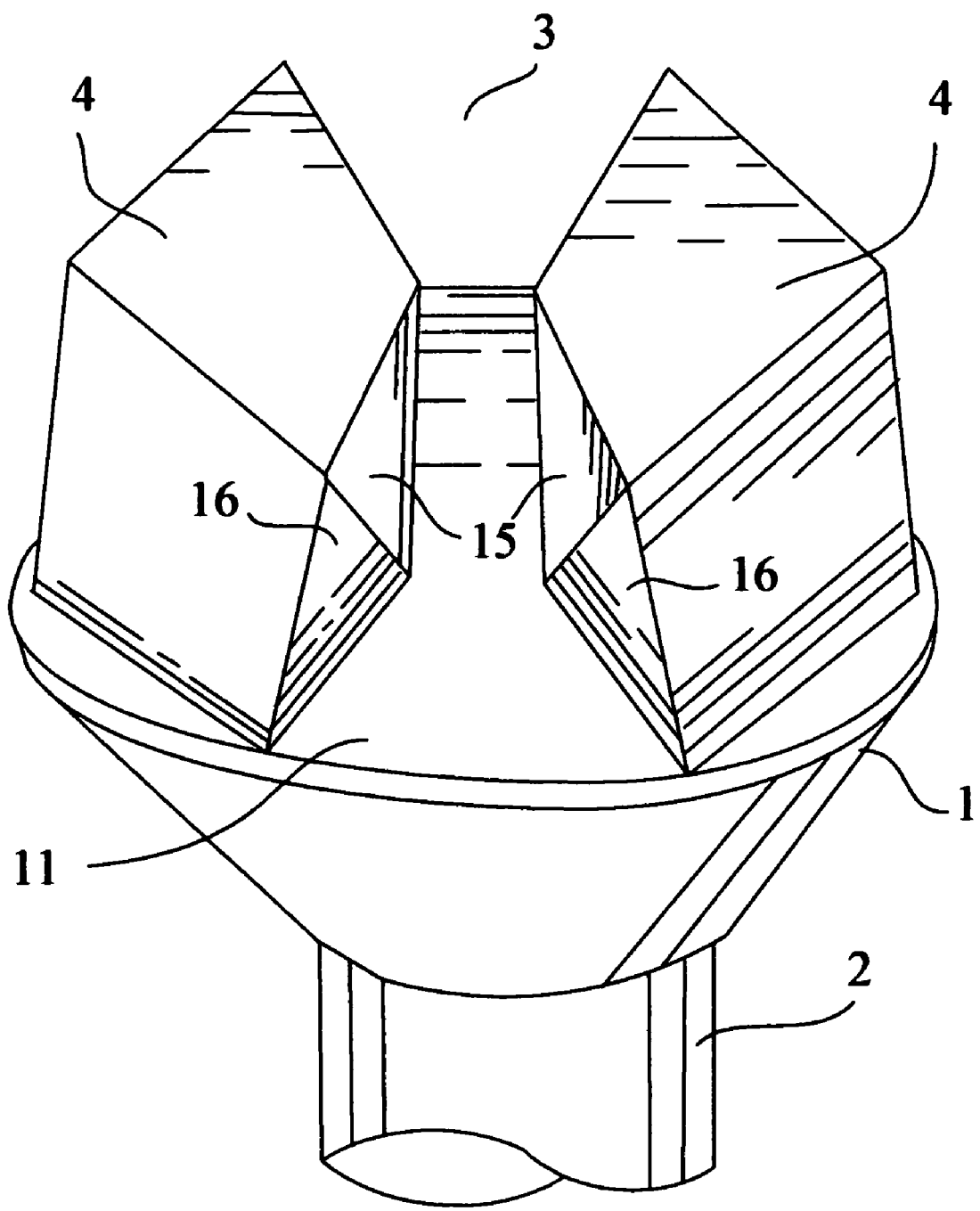
FIG. 2 presents a perspective view of another embodiment of a strip resistant screw head in accordance with the inventive disclosures herein, the head being configured to be driven by a driver tip of the present inventive disclosures, or by a hexagonal socket and provided with a second angled screw slot face.
Figure 5:
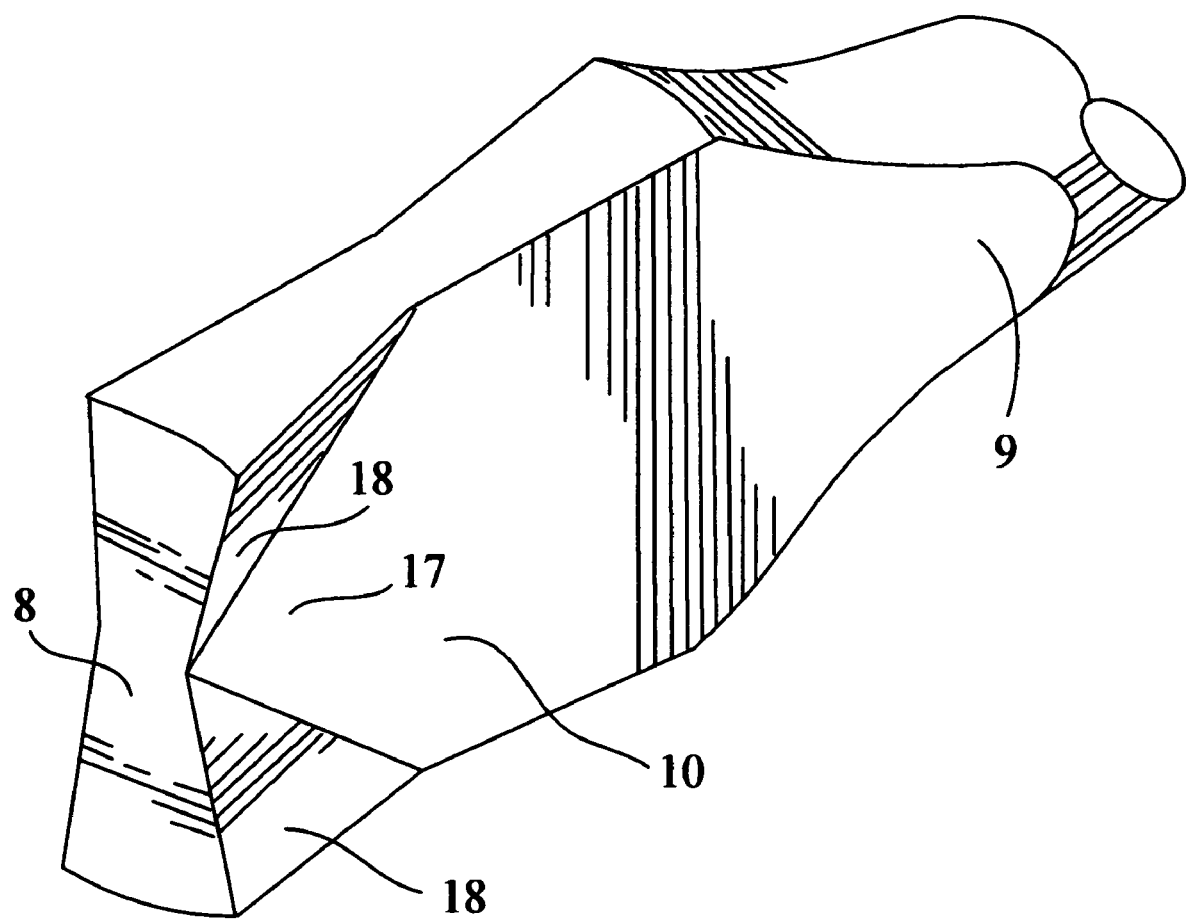
FIG. 5 presents a perspective view of one embodiment of a strip resistant screwdriver tip in accordance with the inventive disclosures herein, the driver tip being configured to drive the second angled screw head of FIG. 2.

Turning now to the combination of embodiments depicted in FIG. 2 and FIG. 5:

FIG. 2 depicts another embodiment of strip resistant screw head in accordance with the inventive disclosures presented herein. FIG. 5 depicts another particular embodiment of a strip resistant screwdriver tip which when used in combination with the screw head embodiment of FIG. 2 provides a strip resistant screw and screwdriver tip combination. In FIG. 2 the screw comprises a shank portion 2 onto which a screw head 1 is formed or secured. The screw head 1 is provided with a slot 3 which bisects the top portion or top face 4 of the screw head. As can be seen at the top face 4 of the screw head, the screw head slot tapers across the top portion of the head such that the slot opening in the top face is narrowest at a center portion of the head and widens outwardly towards the circumferential head edges. The circumferential outside edges of the screw head have multiple substantially flat angled faces configured to engage and be driven by a hexagonal socket of a socket wrench if desired. The sidewalls which form the slot in the head comprise four quadrant sidewall portions of similar form, having two quadrants to a head side (as the slot bisects the head into 2 portions). Each quadrant sidewall portion has a similar form comprising two joined faces, one a first flat face 15 normal to the screw head bottom surface and having one edge intersecting the top face 4 of the head, and a second flat face 16 joined at one edge to another edge of the first flat face 15 and intersecting the screw head bottom surface 11 at an incline angle of between 20 to 99 degrees relative to the screw head bottom surface, the second flat face incline forming the ledge for capturing the screwdriver tip.

Focusing more on FIG. 5 in combination with FIG. 2, in FIG. 5 the screwdriver tip is sized and configured to engage into the screw slot of FIG. 2. The tip having a screw slot insertion end 8, a driven portion 9, and a middle portion 10 between the insertion end and the driven portion. The screwdriver tip screw slot insertion end has a bottom face 8 which when in use mates against the bottom face 11 of the screw slot. The screwdriver tip has opposing major front and rear torque drive faces, each torque drive face having two similarly formed halves. Each half sharing a portion of a first flat face 17 and having a second flat face 18, the first and second faces of each half being joined along a common edge.

The first flat face 17 substantially normal to the tip bottom face 8, and the second flat face 18 joined to an edge of the first flat face 17 and intersecting the tip bottom face 8 at an incline angle of between 20 to 99 degrees relative to the tip bottom face 8, the two joined faces sized and formed to be received into the screw head slot of FIG. 2, engage the screw head joined faces 15 and 16 of FIG. 2 and be retentively engaged by the ledge of the screw slot. The second flat faces 18 of the tip of the driver acting as the torque drive faces transmitting torque to the second flat faces 16 of the screw head in FIG. 2.

Figure 3:
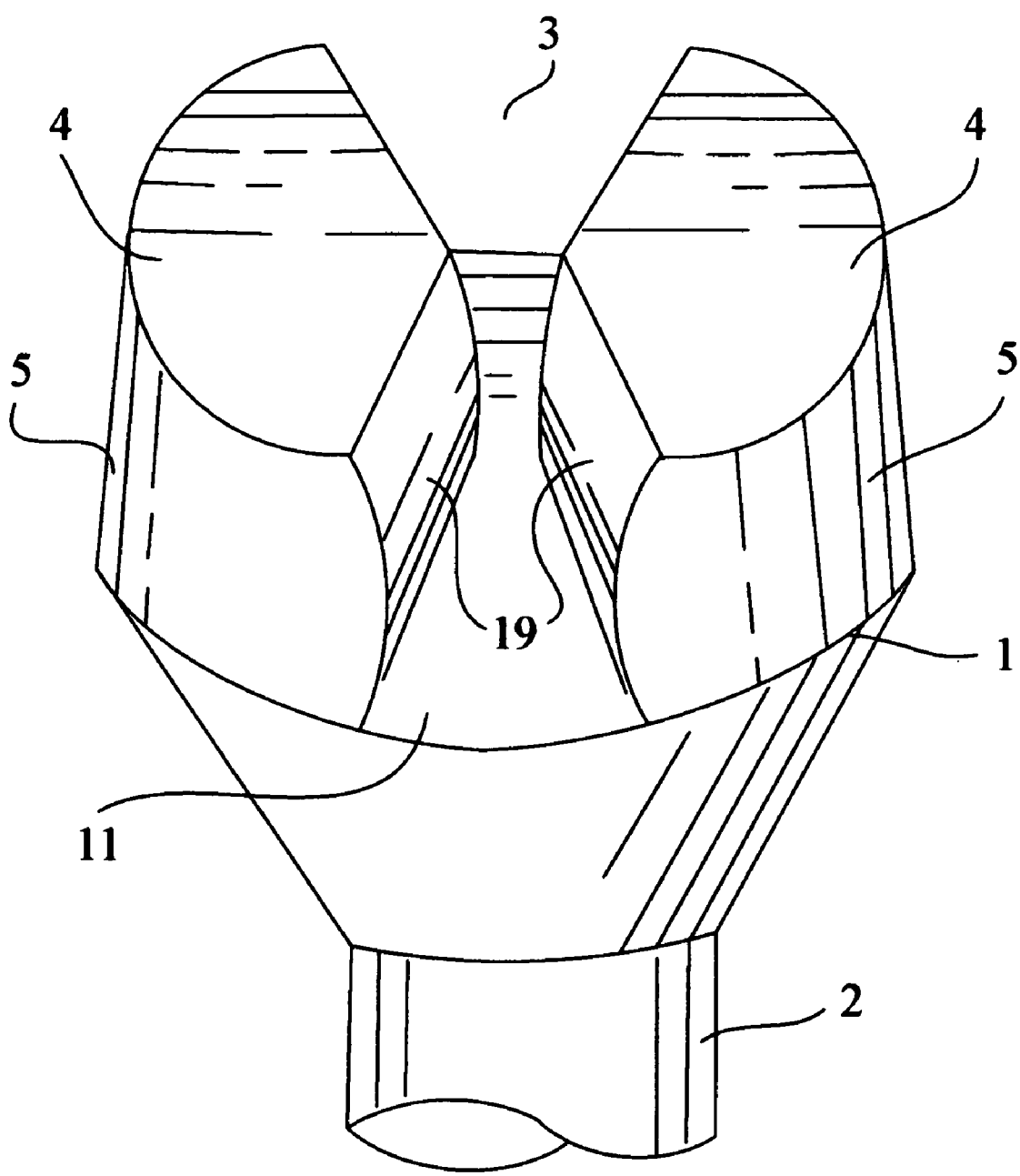
FIG. 3 presents a perspective view of another embodiment of a strip resistant screw head in accordance with the inventive disclosures herein, having curved slot faces.
Figure 6:
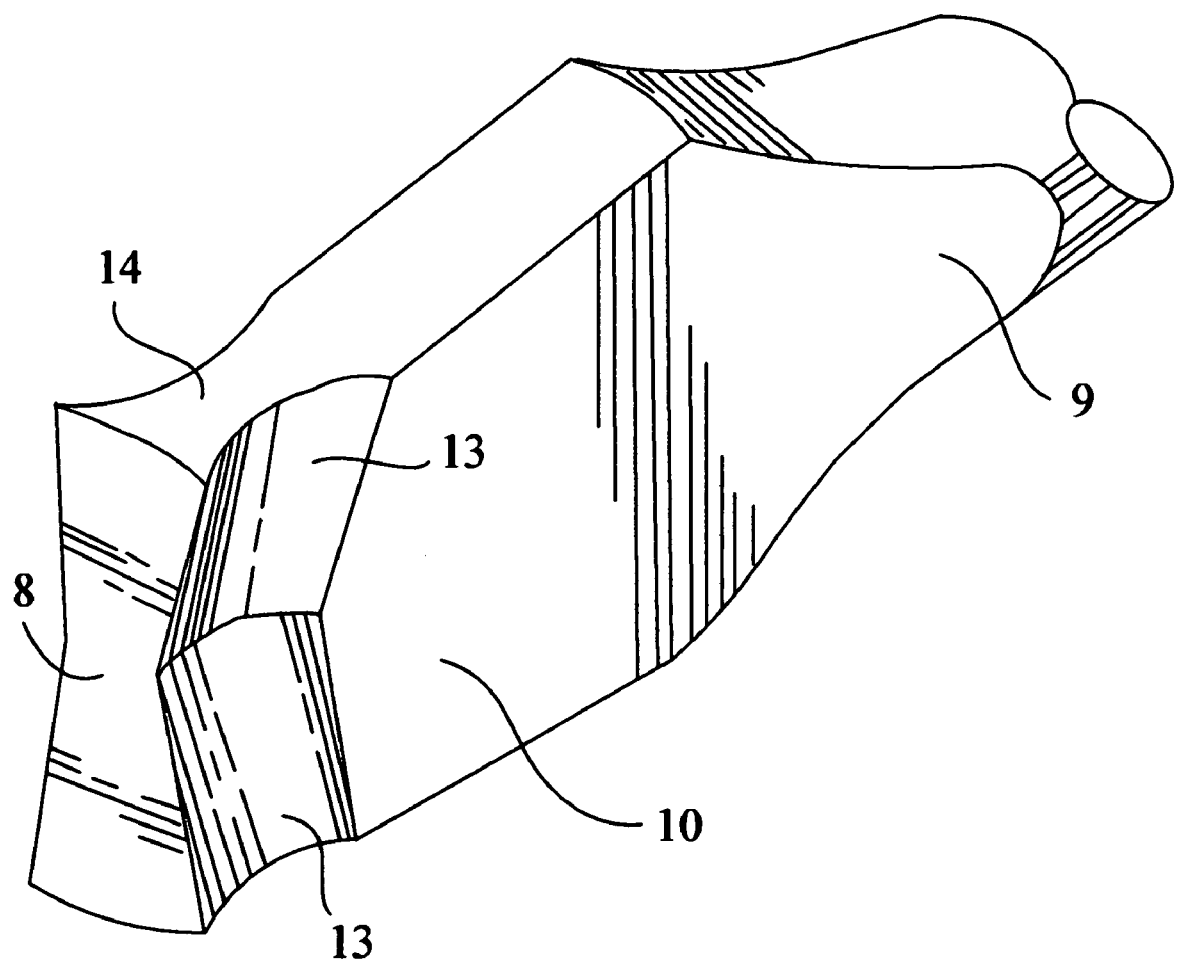
FIG. 6 presents a perspective view of one embodiment of a strip resistant screwdriver tip in accordance with the inventive disclosures herein, the driver tip being configured to drive the curved face screw slot screw head of FIG. 3.

Turning now to the combination of embodiments depicted in FIG. 3 and FIG. 6:

FIG. 3 depicts one particular embodiment of strip resistant screw head in accordance with the inventive disclosures presented herein. FIG. 6 depicts one particular embodiment of a strip resistant screwdriver tip which when used in combination with the screw head embodiment of FIG. 3 provides a strip resistant screw and screwdriver tip combination. In FIG. 3 the screw comprises a shank portion 2 onto which a screw head 1 is formed or secured. The screw head 1 is provided with a tapered slot 3 which bisects the top portion or top face 4 of the screw head. As can be seen at the top face 4 of the screw head, the screw head slot tapers across the top portion of the head such that the slot opening in the top face is narrowest at a center portion of the head and widens outwardly towards the circumferential side edges 5 of the screw head. As can be seen in FIG. 3, the screw head sidewalls have a convex curved form between the head bottom surface 11 and the top end portion 4 of the head. The lower half of the convex curved surfaces 19, the half intersecting the slot bottom surface 11 forming the ledge to retentively capture the driver tip of FIG. 6. In FIG. 3 the screw head comprises two circumferential side edges 5. Strip resistant screw heads in accordance with the inventive disclosures herein may comprise one or more circumferential edges, the invention is not limited to two circumferential screw head edges.

Focusing more on FIG. 6 in combination with FIG. 3, in FIG. 6 the screwdriver tip is sized and configured to engage into the screw slot of FIG. 3. The tip having a screw slot insertion end 8, a driven portion 9, and a middle portion 10 between the insertion end and the driven portion. The screwdriver tip screw slot insertion end has a bottom face 8 which when in use mates against the bottom face 11 of the screw slot. The screwdriver tip has opposing major front and rear torque drive faces 13 joined by circumferential right and left side faces 14. The front and rear circumferential faces 14 formed such that the tip widens from a central portion of the tip outwards towards the right and left circumferential faces 14. The screwdriver tip front and rear drive faces 13 have a concave form, each sized and formed to be received into the screw head slot 3 of FIG. 3, engage the screw head sidewalls 19 and be retentively engaged by the ledge of the screw slot.

Figure 4:
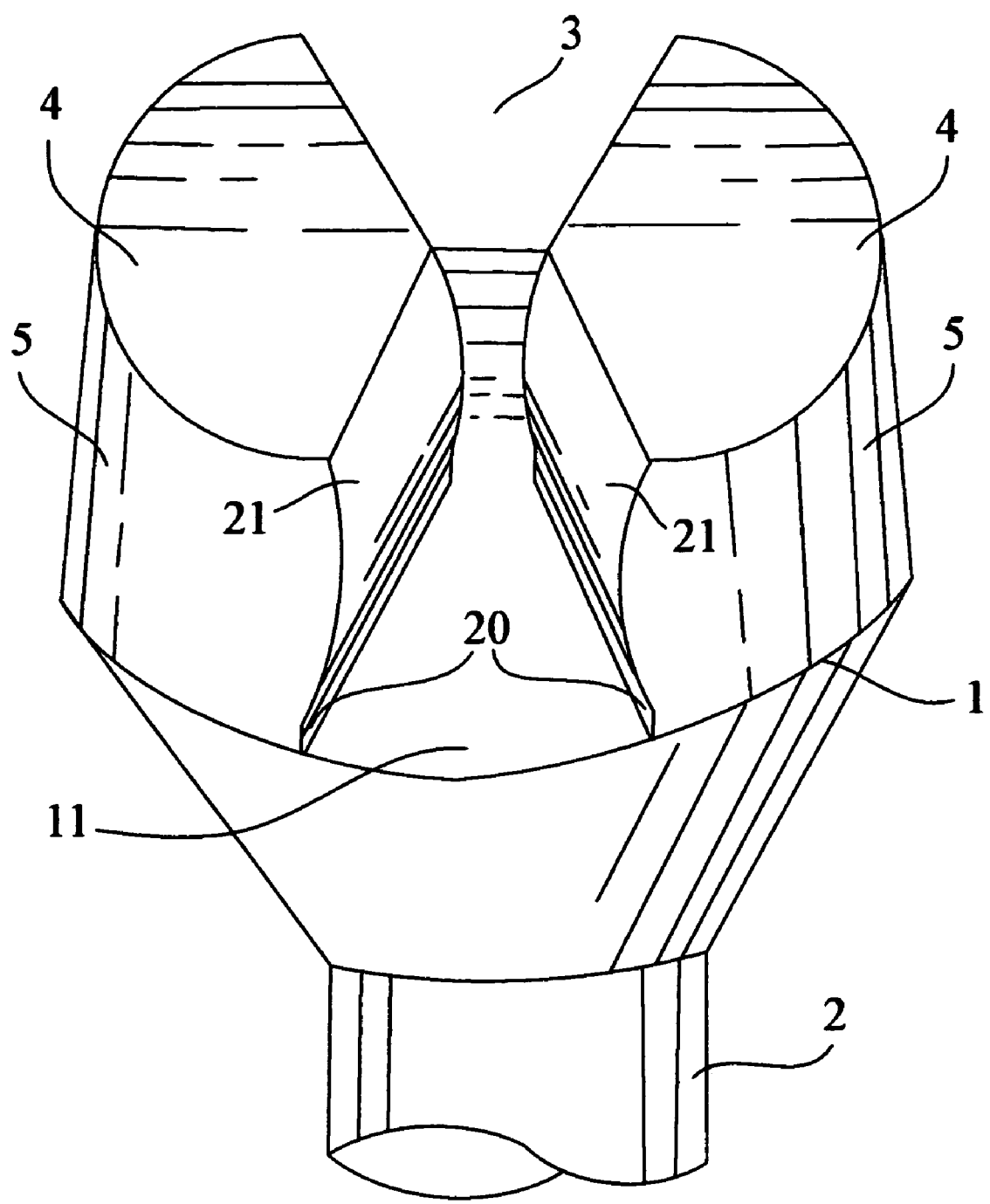
FIG. 4 presents a perspective view of one embodiment of a strip resistant screw head in accordance with the inventive disclosures herein, having curved slot faces and a vertical bottom faced ledge portion.
Figure 8:
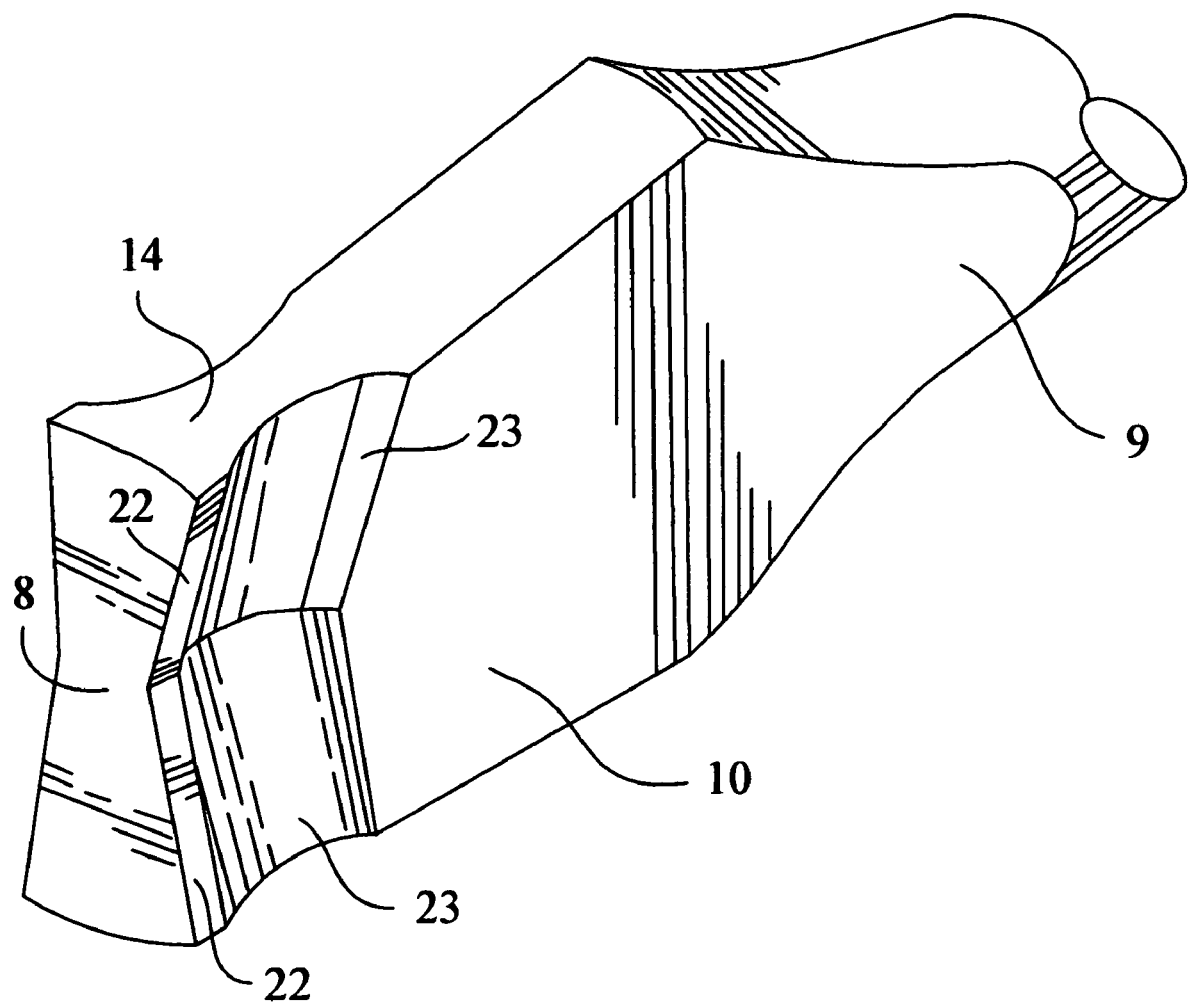
FIG. 8 presents a perspective view of one embodiment of a strip resistant screwdriver tip in accordance with the inventive disclosures herein, the driver tip being configured to drive the curve face screw slot with flat ledge face screw head of FIG. 4.

Turning now to the combination of embodiments depicted in FIG. 4 and FIG. 8:

FIG. 4 depicts one particular embodiment of strip resistant screw head in accordance with the inventive disclosures presented herein. FIG. 8 depicts one particular embodiment of a strip resistant screwdriver tip which when used in combination with the screw head embodiment of FIG. 4 provides a strip resistant screw and screwdriver tip combination. In FIG. 4 the screw comprises a shank portion 2 onto which a screw head 1 is formed or secured. The screw head 1 is provided with a tapered slot 3 which bisects the top portion or top face 4 of the screw head. As can be seen at the top face 4 of the screw head, the screw head slot tapers across the top portion of the head such that the slot opening in the top face is narrowest at a center portion of the head and widens outwardly towards the circumferential side edges 5 of the screw head. As can be seen in FIG. 4, the screw head sidewalls each consist of two joined faces, one a flat face 20 normal to the screw head bottom surface 11 and intersecting the bottom surface 11 at one edge of the flat face, and a second convex curved face 21 joining the flat face 20 at the opposite edge of the flat face and spanning to join the top end portion 4 of the head. The lower half of the convex curved face 21, the half joining the edge of the slot first flat face 20, taken together with the slot first flat face 20, together forming the ledge to retentively capture the driver tip of FIG. 8. In FIG. 4 the screw head comprises two circumferential side edges 5. Strip resistant screw heads in accordance with the inventive disclosures herein may comprise one or more circumferential edges, however, the invention is not limited to two circumferential screw head edges.

Focusing more on FIG. 8 in combination with FIG. 4, in FIG. 8 the screwdriver tip is sized and configured to engage into the screw slot of FIG. 4. The tip having a screw slot insertion end 8, a driven portion 9, and a middle portion 10 between the insertion end and the driven portion. The screwdriver tip screw slot insertion end has a bottom face 8 which when in use mates against the bottom face 11 of the screw slot. As can be seen in FIG. 8, the screwdriver tip front and rear faces each having two joined faces, one a tip flat face 22 normal to the tip bottom face 8 having an edge joining the tip bottom face 8, and a second convex curved face 23 joining the tip flat face 22 at the opposite edge of the tip flat face 22 and spanning toward the middle portion 10 of the driver tip. The two joined faces 22 and 23 are sized and formed to be received into the screw head slot 3 of the screw head in FIG. 4 and to engage the screw head sidewalls and be retentively engaged by the ledge of the screw slot.

Various embodiments of the inventive disclosures herein utilize the same general shape, sizes and design as traditional screws with the exception that the screw head and the driver tip are redesigned, as illustrated by example in the drawings and described in this inventive disclosure. In various embodiments the head may be generally round or hexagonal, although this does not preclude the use of other head forms with the disclosures presented herein. The head slot, in various embodiments, generally employ slot walls that indent in some portion of the wall, the indent portion forming a ledge under which a specifically configured screwdriver tip may by retentively captured and thus preventing the tip from lifting from the screw slot and stripping of the screw head. The screw slot and driver also generally employ a tapered slot form across the top of the screw head such that the slot widens from a central portion of the head out to the outer circumferential edges of the head. Additionally, the narrow portion of the slot matching in form a narrow portion of the driver tip such that the driver tip tends not to slide across the screw slot and off the screw head during use, as the narrow portion of the screw slot prevents the wider portions of the driver tip from sliding past the narrow slot portion, and thereby prevents the driver tip from sliding across the screw head slot, partially disengaging and damaging or stripping the screw head. Utilizing these inventive disclosures described herein prevents the screwdriver tip from slipping off the head and results in the need for less downward pressure to be applied when tightening or loosening screws. These features also preserve the screw head slot from damage.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, mechanical, software and electrical changes may be made without departing from the spirit or scope of the invention. To avoid unnecessary detail, the description omits certain information known to those skilled in the art The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A threaded screw and screwdriver tip in combination comprising:
   the screw comprising:
      a screw shank; and
      a screw head having a tapered slot bisecting a top end portion of the head, the head secured at an opposing bottom end to the shank portion, the screw head comprising one or more circumferential side edges joining the top end portion and the head bottom end, the slot tapered across the top portion of the head such that the slot is narrowest at a center portion of the head and widens outwardly, the slot having substantially opposing inclined sidewall surfaces connected by a substantially flat bottom surface; the sidewall surfaces inclined such that the slot is widest where the sidewalls intersect the bottom surface, the walls inclined to form a ledge for capturing the screwdriver tip against the sidewalls and the slot bottom surface; wherein the screw head sidewalls having two halves, each half consisting of two joined faces, one a first flat face normal to the screw head bottom surface and having one edge intersecting the top end portion of the head, and a second flat face joined at one edge to another edge of the first flat face and intersecting the screw head bottom surface at an incline angle of between 20 to 99 degrees relative to the screw head slot bottom surface, the second flat face incline forming the ledge for capturing the screwdriver tip; and
   the screwdriver tip sized and configured for being received and engaged into the screw slot, the tip having a screw slot insertion end, a driven portion, and a middle portion between the insertion end and the driven portion, the tip comprising:
      a tip bottom face at the insertion end of the tip; and
      opposing major front and rear torque drive faces joined by circumferential right and left side faces, the faces intersecting the tip bottom face, the front and rear faces formed such that the tip widens from a central portion of the tip outwards towards the right and left faces; the right and left faces formed such that the bottom face is wider than a distal parallel section taken through the middle portion of the tip so that the insertion end of the tip can be retentively engaged under the ledge of the screw slot; wherein the screwdriver tip front and rear faces each having two halves, each half having two tip joined faces, a first tip flat face normal to the tip bottom face, and a second tip flat face joined to an edge of the first tip flat face and intersecting the tip bottom face at an incline angle of between 20 to 99 degrees relative to the tip bottom face, the two tip joined faces sized and formed to be received into the screw head slot, engage the screw head joined faces and be retentively engaged by the ledge of the screw slot; and an incline angle of the screw and the screw driver tip is between 45 and 90 degrees.

2. The combination of claim 1 wherein the circumferential side edges of the screw form a substantially circular intersection at the top end portion of the head.

3. The combination of claim 1 wherein the circumferential side edges of the screw head have angled faces configured to engage and be driven by a hexagonal socket of a socket wrench.

4. The combination of claim 1 wherein:
the screw head slot sidewalls taper continuously from the slot bottom surface up the head to the top end portion of the head at an angle between 45 and 89 degrees relative to the slot bottom surface; and
the screwdriver tip front and rear faces are tapered, sized and formed to be received into the screw head slot and retentively engaged by the ledge of the screw slot.

5. A threaded screw and screwdriver tip in combination comprising:

the screw comprising:

a screw shank; and a screw head having a tapered slot bisecting a top end portion of the head, the head secured at an opposing bottom end to the shank portion, the screw head comprising one or more circumferential side edges joining the top end portion and the head bottom end, the slot tapered across the top portion of the head such that the slot is narrowest at a center portion of the head and widens outwardly, the slot having substantially opposing screw head slot sidewalls each consist of two joined faces, one a flat face perpendicular to the screw head slot bottom surface and intersecting the bottom surface at one edge of the flat face, and a second convex curved face joining the flat face at an opposite edge of the flat face and spanning to join the top end portion of the head; and the screwdriver tip front and rear faces each having two joined faces, one a tip flat face normal to the tip bottom face having an edge joining the tip bottom face, and a second concave curved face joining the tip flat face at an opposite edge of the tip flat face and spanning toward the driven portion, the two joined faces of the tip front and rear faces sized and formed to be received into the screw head slot, engage the screw head sidewalls and be retentively engaged by the ledge of the screw slot.

* * * * *